United States Patent
Nonomura et al.

(10) Patent No.: US 8,414,453 B2
(45) Date of Patent: Apr. 9, 2013

(54) CONTINUOUSLY VARIABLE TRANSMISSION AND CONTROL METHOD THEREOF

(75) Inventors: Ryousuke Nonomura, Kawasaki (JP);
Takashi Eguchi, Machida (JP);
Tomohiro Utagawa, Sagamihara (JP);
Keita Okudaira, Zama (JP)

(73) Assignee: Jatco Ltd, Fuji-shi (JP)

( * ) Notice: Subject to any disclaimer, the term of this patent is extended or adjusted under 35 U.S.C. 154(b) by 417 days.

(21) Appl. No.: 12/862,660

(22) Filed: Aug. 24, 2010

(65) Prior Publication Data

US 2011/0053718 A1 Mar. 3, 2011

(30) Foreign Application Priority Data

Aug. 26, 2009 (JP) ................................. 2009-195867

(51) Int. Cl.
*F16H 61/00* (2006.01)
(52) U.S. Cl. ........................................................ 477/45
(58) Field of Classification Search .................... 477/45, 477/46, 50, 115
See application file for complete search history.

(56) References Cited

U.S. PATENT DOCUMENTS

| | | | |
|---|---|---|---|
| 5,492,508 A | 2/1996 | Tsukamoto et al. | |
| 7,493,203 B2 | 2/2009 | Bitzer et al. | |
| 2004/0116245 A1* | 6/2004 | Yamamoto et al. | 477/46 |
| 2004/0127332 A1* | 7/2004 | Kang et al. | 477/45 |
| 2005/0227809 A1 | 10/2005 | Bitzer et al. | |
| 2008/0009390 A1* | 1/2008 | Tanaka et al. | 477/45 |

FOREIGN PATENT DOCUMENTS

| | | |
|---|---|---|
| JP | 60-037455 A | 2/1985 |
| JP | 05-079554 A | 3/1993 |
| JP | 07-083321 A | 3/1995 |
| JP | 2004-332878 A | 11/2004 |
| WO | WO 03/067127 A2 | 8/2003 |

* cited by examiner

*Primary Examiner* — Edwin A Young
(74) *Attorney, Agent, or Firm* — Foley & Lardner LLP

(57) ABSTRACT

An inertia torque input into the continuously variable speed change mechanism from the subtransmission mechanism is estimated during the shift in the subtransmission mechanism. During the shift in the subtransmission mechanism, a required oil pressure, which is an oil pressure required to maintain a contact frictional force between the respective pulleys and the wrapped member, is calculated on the basis of an input torque into the continuously variable speed change mechanism and the inertia torque.

18 Claims, 10 Drawing Sheets

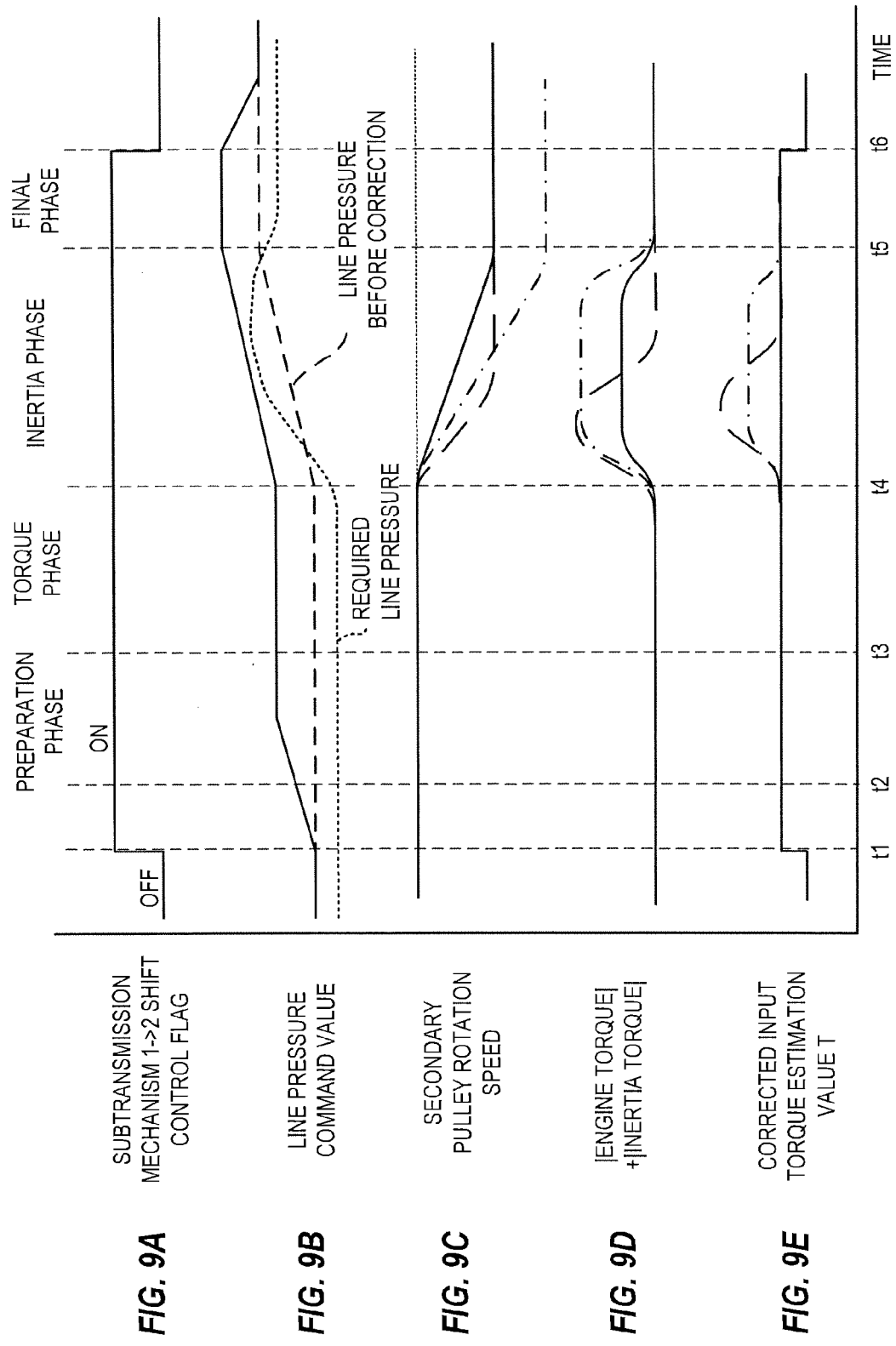

CONTINUOUSLY VARIABLE TRANSMISSION AND CONTROL METHOD THEREOF

FIELD OF THE INVENTION

This invention relates to a continuously variable transmission including a continuously variable speed change mechanism and a subtransmission mechanism and a control method thereof, and more particularly to hydraulic control of the continuously variable transmission.

BACKGROUND OF THE INVENTION

A continuously variable transmission including a continuously variable speed change mechanism and a subtransmission mechanism is known. The subtransmission mechanism capable of shifting between two forward gear positions is connected in series to an output shaft of the continuously variable speed change mechanism, and by shifting the subtransmission mechanism in accordance with operating conditions, a speed ratio range that can be realized by the continuously variable transmission is enlarged.

In this kind of continuously variable transmission, when the subtransmission mechanism is shifted from a low speed gear to a high speed gear while a vehicle is traveling, shift shock is caused by variation in a through speed ratio, which is the overall speed ratio of the continuously variable transmission. In JP05-79554A, control is performed to keep the through speed ratio constant by increasing the speed ratio of the continuously variable speed change mechanism rapidly in alignment with a shift in the subtransmission mechanism.

SUMMARY OF THE INVENTION

Here, the continuously variable speed change mechanism includes a pair of pulleys with modifiable groove widths and a belt wrapped around the pulleys such that by modifying the respective groove widths of the pulleys using working oil pressure supplied to the respective pulleys, the speed ratio can be modified continuously. When the working oil pressure is insufficient, a thrust of the pulleys sandwiching the belt becomes insufficient, causing the belt to slip, and therefore a line pressure serving as a source pressure of the working oil pressure is set appropriately in accordance with an engine torque input into a primary pulley to ensure that the working oil pressure is sufficient.

However, when the subtransmission mechanism is shifted from the low speed gear to the high speed gear, a rotation speed of the output shaft of the continuously variable speed change mechanism, i.e. a rotation speed of an input shaft of the subtransmission mechanism, decreases, and as a result, inertia torque acts in a direction for restricting rotation of the output shaft. Hence, the engine torque and the inertia torque act on the continuously variable speed change mechanism simultaneously in opposite directions, and this may lead to a deficiency in the pulley thrust, causing the belt to slip.

It is an object of this invention to prevent belt slippage in a continuously variable transmission including a continuously variable speed change mechanism a subtransmission mechanism.

According to an aspect of the present invention, a continuously variable transmission installed in a vehicle is provided. The transmission includes a continuously variable speed change mechanism that has a primary pulley into which a driving force is input from an power source, a secondary pulley which outputs a driving force, and a wrapped member wrapped around the primary pulley and the secondary pulley, and that is capable of modifying a speed ratio continuously in accordance with oil pressure supplied to the primary pulley and the secondary pulley; a subtransmission mechanism that is provided on a downstream side of the continuously variable speed change mechanism and includes, as forward gear positions, a first gear position and a second gear position having a smaller speed ratio than the first gear position; a shift control unit that controls the speed ratio of the continuously variable speed change mechanism in an opposite direction to a shift in the subtransmission mechanism during a shift in the subtransmission mechanism; a required oil pressure calculation unit that calculates a required oil pressure, which is an oil pressure required to maintain a contact frictional force between the respective pulleys and the wrapped member, on the basis of an input torque input into the continuously variable speed change mechanism from the power source; an oil pressure supply unit that supplies oil pressure to the continuously variable speed change mechanism on the basis of the required oil pressure; and an inertia torque estimation unit that estimates an inertia torque input into the continuously variable speed change mechanism from the subtransmission mechanism during a shift in the subtransmission mechanism. During a shift in the subtransmission mechanism, the required oil pressure calculation unit calculates the required oil pressure on the basis of the input torque and the inertia torque.

According to another aspect of the present invention, a control method for a continuously variable transmission installed in a vehicle, is provided. The transmission includes a continuously variable speed change mechanism that has a primary pulley into which a driving force is input from an power source, a secondary pulley which outputs a driving force, and a wrapped member wrapped around the primary pulley and the secondary pulley, and that is capable of modifying a speed ratio continuously in accordance with oil pressure supplied to the primary pulley and the secondary pulley, and a subtransmission mechanism that is provided on a downstream side of the continuously variable speed change mechanism and includes, as forward gear positions, a first gear position and a second gear position having a smaller speed ratio than the first gear position. The method includes controlling the speed ratio of the continuously variable speed change mechanism in an opposite direction to a shift in the subtransmission mechanism during a shift in the subtransmission mechanism; calculating a required oil pressure, which is an oil pressure required to maintain a contact frictional force between the respective pulleys and the wrapped member, on the basis of an input torque input into the continuously variable speed change mechanism from the power source; supplying oil pressure to the continuously variable speed change mechanism on the basis of the required oil pressure; and estimating an inertia torque input into the continuously variable speed change mechanism from the subtransmission mechanism during a shift in the subtransmission mechanism. During a shift in the subtransmission mechanism, the required oil pressure is calculated on the basis of the input torque and the inertia torque.

Embodiments and advantages of this invention will be described in detail below with reference to the attached figures.

BRIEF DESCRIPTION OF THE DRAWINGS

FIGS. 9A-9E are timing charts showing variation in various parameters of the transmission during a shift in a subtransmission mechanism.

DESCRIPTION OF THE PREFERRED EMBODIMENTS

In the following description, a "speed ratio" of a certain transmission mechanism is a value obtained by dividing an input rotation speed of the transmission mechanism by an output rotation speed of the transmission mechanism. Further, a "Lowest speed ratio" denotes a maximum speed ratio of the transmission mechanism, and a "Highest speed ratio" denotes a minimum speed ratio of the transmission mechanism.

Figure 1:
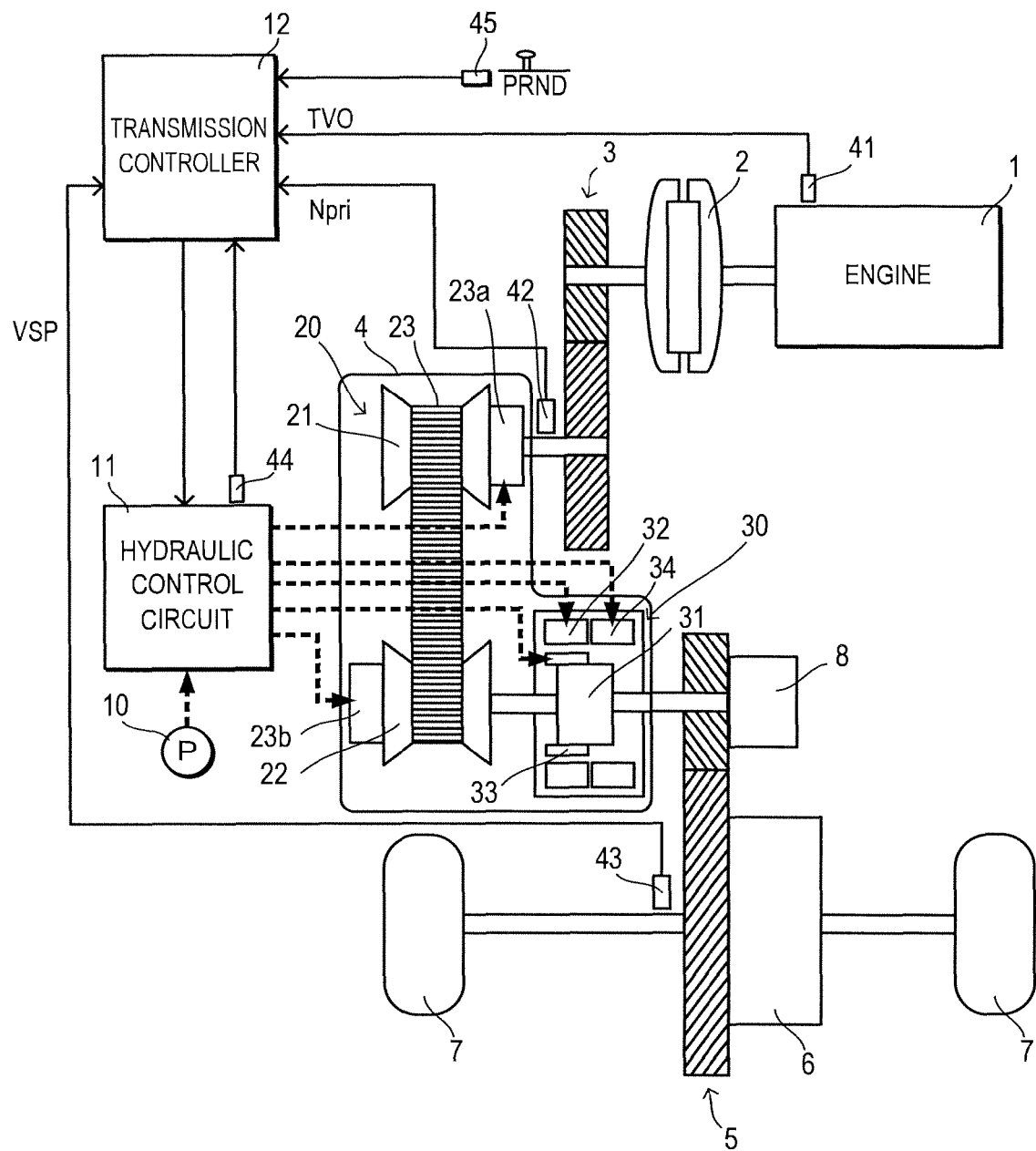
FIG. 1 is a schematic diagram showing the constitution of a vehicle installed with a continuously variable transmission according to an embodiment.

FIG. 1 is a schematic constitutional diagram of a vehicle installed with a continuously variable transmission according to an embodiment of this invention. The vehicle has an engine 1 as a power source. Output rotation of the engine 1 is transmitted to a drive wheel 7 via a torque converter 2 having a lockup clutch, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically so that the output shaft is incapable of rotation during parking.

The vehicle is further provided with an oil pump 10 which is driven using a part of the power of the engine 1, a hydraulic control circuit 11 which regulates an oil pressure from the oil pump 10 and supplies the regulated oil pressure to various sites of the transmission 4, and a transmission controller 12 which controls the hydraulic control circuit 11.

To describe the respective constitutions, the transmission 4 includes a belt type continuously variable transmission mechanism (to be referred to as a "variator 20" hereafter), and a subtransmission mechanism 30 provided in series with the variator 20. The tee in "provided in series" means that the variator 20 and the subtransmission mechanism 30 are provided in series on a power transmission path extending from the engine 1 to the drive wheel 7. The subtransmission mechanism 30 may be directly connected to an output shaft of the variator 20, as in this example, or via another transmission mechanism or power transmission mechanism (for example, a gear train).

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism. The subtransmission mechanism 30 includes a Ravigneaux planetary gear mechanism 31 coupling the carriers of two planetary gears, and a plurality of frictional engagement elements (a Low brake 32, a High clutch 33, and a Rev brake 34) connected to a plurality of rotary elements constituting the Ravigneaux planetary gear mechanism 31 to modify the rotation states thereof. The gear position of the subtransmission mechanism 30 is changed by adjusting the oil pressure supplied to the respective frictional engagement elements 32 to 34 such that the engagement/disengagement states of the respective frictional engagement elements 32 to 34 are modified. For example, by engaging the Low brake 32 and disengaging the High clutch 33 and Rev brake 34, the gear position of the subtransmission mechanism 30 is set in a first speed. By engaging the High clutch 33 and disengaging the Low brake 32 and Rev brake 34, the gear position of the subtransmission mechanism 30 is set in a second speed having a smaller speed ratio than the first speed. By engaging the Rev brake 34 and disengaging the Low brake 32 and the High clutch 33, the gear position of the subtransmission mechanism 30 is set in reverse. It should be noted that in the following description, a state in which the gear position of the subtransmission mechanism 30 is in the first speed will be expressed as "the transmission 4 is in a low speed mode", and a state in which the gear position of the subtransmission mechanism 30 is in the second speed will be expressed as "the transmission 4 is in a high speed mode".

Figure 2:
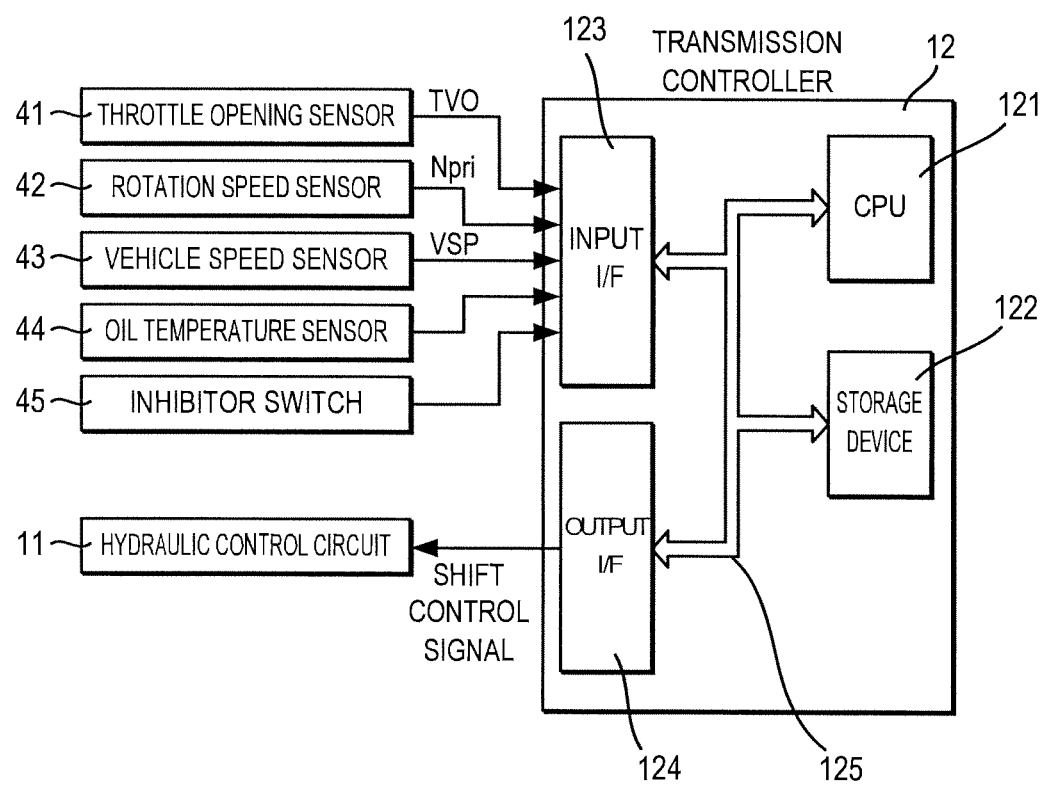
FIG. 2 is a schematic diagram showing the interior constitution of a transmission controller.

As shown in FIG. 2, the transmission controller 12 is constituted by a CPU 121, a storage device 122 including a RAM and a ROM, an input interface 123, an output interface 124, and a bus 125 connecting these components to each other.

An output signal from a throttle opening sensor 41 that detects an opening of a throttle valve of the engine 1 (to be referred to as a "throttle opening TVO" hereafter), an output signal from a rotation speed sensor 42 that detects an input rotation speed of the transmission 4 (=the rotation speed of the primary pulley 21, to be referred to hereafter as a "primary pulley rotation speed Npri"), an output signal from a vehicle speed sensor 43 that detects a traveling speed of the vehicle (to be referred to hereafter as a "vehicle speed VSP"), an output signal from an oil temperature sensor 44 that detects an oil temperature of the transmission 4, an output signal from an inhibitor switch 45 that detects a position of a select lever, and so on are input into the input interface 123.

The storage device 122 stores a shift control program for the transmission 4 and a shift map (FIG. 3) used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the transmission 4. As a result, the speed ratio vRatio of the variator 20 is modified and the gear position of the subtransmission mechanism 30 is changed, whereby a shift is performed in the transmission 4.

Figure 3:
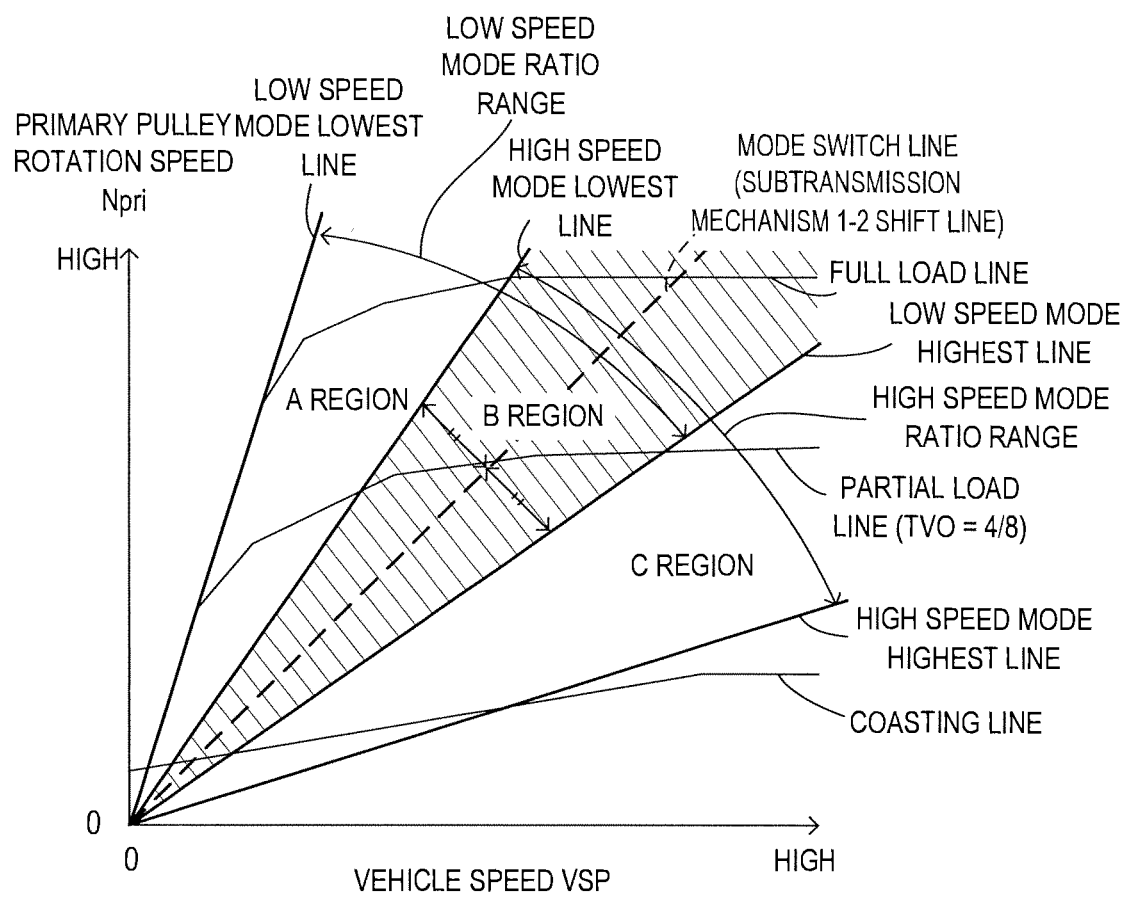
FIG. 3 is a view showing an example of a shift map of the transmission.

FIG. 3 shows an example of the shift map stored in the storage device 122 of the transmission controller 12.

On the shift map, an operating point of the transmission 4 is determined on the basis of the vehicle speed VSP and the primary pulley rotation speed Npri. An incline of a line linking the operating point of the transmission 4 and a zero point in the lower left corner of the shift map indicates the speed ratio of the transmission 4 (an overall speed ratio obtained by multiplying the speed ratio of the subtransmission mechanism 30 with the speed ratio vRatio of the variator 20, to be referred to hereafter as a "through speed ratio Ratio"). On this shift map, similarly to a shift map of a conventional belt type continuously variable transmission, a shift line is set at each throttle opening TVO, and a shift is performed in the transmission 4 according to a shift line selected in accordance with the throttle opening TVO. For ease of understanding, FIG. 3 shows only a full load line (a shift line used when the throttle opening TVO=8/8), a partial load line (a shift line used when the throttle opening TVO=4/8), and a coasting line (a shift line used when the throttle opening TVO=0).

When the transmission 4 is in the low speed mode, the transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the transmission 4 moves within an A region and a B region. When the transmission 4 is in the high speed mode, the transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the transmission 4 moves within the B region and a C region.

The speed ratios of the respective gear positions of the subtransmission mechanism 30 are set such that a speed ratio corresponding to the low speed mode Highest line (low speed mode Highest speed ratio) is smaller than a speed ratio corresponding to the high speed mode Lowest line (high speed mode Lowest speed ratio). In so doing, a low speed mode ratio range, which is the through speed ratio Ratio range of the transmission 4 in the low speed mode, and a high speed mode ratio range, which is the through speed ratio Ratio range of the transmission 4 in the high speed mode, partially overlap such that when the operating point of the transmission 4 is in the B region, which is sandwiched between the high speed mode Lowest line and the low speed mode Highest line, the transmission 4 can select either the low speed mode or the high speed mode.

Further, on the shift map, a mode switch line on which the subtransmission mechanism 30 performs a shift (a 1-2 shift line of the subtransmission mechanism 30) is set midway between the high speed mode Lowest line and the low speed mode Highest line. The through speed ratio corresponding to the mode switch line (to be referred to hereafter as a "mode switch speed ratio mRatio") takes an intermediate value between the high speed mode Lowest speed ratio and the low speed mode Highest speed ratio, for example a value obtained by adding the high speed mode Lowest speed ratio to the low speed mode Highest speed ratio and dividing the result by two. When the operating point of the transmission 4 crosses the mode switch line, or in other words when the through speed ratio Ratio of the transmission 4 varies across the mode switch speed ratio mRatio, the transmission controller 12 performs mode switch control. In the mode switch control, the transmission controller 12 performs a shift in the subtransmission mechanism 30 and modifies the speed ratio vRatio of the variator 20 in an opposite direction to the variation direction of the speed ratio of the subtransmission mechanism 30.

More specifically, when the through speed ratio Ratio of the transmission 4 shifts from being larger than the mode switch speed ratio mRatio to being smaller than the mode switch speed ratio mRatio, the transmission controller 12 changes the gear position of the subtransmission mechanism 30 from the first speed to the second speed (subtransmission mechanism 1-2 shift) and modifies the speed ratio vRatio of the variator 20 to the large speed ratio side. Conversely, when the through speed ratio Ratio of the transmission 4 shifts from being smaller than the mode switch speed ratio mRatio to being larger than the mode switch speed ratio mRatio, the transmission controller 12 changes the gear position of the subtransmission mechanism 30 from the second speed to the first speed (subtransmission mechanism 2-1 shift) and modifies the speed ratio vRatio of the variator 20 to the small speed ratio side. During a mode switch, the speed ratio vRatio of the variator 20 is varied in an opposite direction to the speed ratio variation of the subtransmission mechanism 30 in order to suppress an uncomfortable feeling experienced by a driver due to input rotation variation generated by a sudden change in the through speed ratio Ratio of the transmission 4.

Line pressure control executed to control the line pressure supplied to the hydraulic control circuit 11 from the oil pump 10 will now be described. The line pressure is regulated as a source pressure of the pressure supplied to the primary pulley 21 and secondary pulley 22 of the variator 20.

Specifically, on the basis of an output torque of the engine 1, a required thrust of each pulley 21, 22 required to transmit the torque without causing the belt 23 to slip is determined, and on the basis of the required thrust and a pressure-receiving surface area of each pulley 21, 22, a primary pressure command value and a secondary pressure command value are calculated as the required oil pressure of each pulley 21, 22.

Further, a stroke speed of the primary pulley 21 at which a target pulley ratio can be achieved during a shift in the variator 20 is calculated, and a differential thrust required to realize the stroke speed is calculated by referring to a pre-stored map. A final primary pressure command value and a final secondary pressure command value are then calculated by correcting the primary pressure command value and secondary pressure command value in accordance with the required differential thrust.

In so doing, the line pressure can be generated without deficiencies in the primary pressure command value and secondary pressure command value, and can be set at a minimum value without causing the fuel efficiency to deteriorate. In other words, the line pressure is set on the basis of an input torque estimation value which is the input torque of the primary pulley 21.

However, when the gear position of the subtransmission mechanism 30 is modified from the first speed to the second speed and the speed ratio vRatio of the variator 20 is modified to a large speed ratio side, the rotation speed of the output shaft 24 of the variator 20 decreases, and as a result, inertia torque acts in a direction for restricting rotation of the output shaft 24. Hence, the engine torque input into the primary pulley 21 and the inertia torque input into the secondary pulley 22 from the subtransmission mechanism 30 act simultaneously in opposite directions, and this may lead to a deficiency in the pulley thrust, causing the belt 23 to slip.

In other words, if the line pressure is set on the basis of an input torque estimation value that takes only the engine torque into account, it may be impossible to secure sufficient line pressure.

Figure 4A:
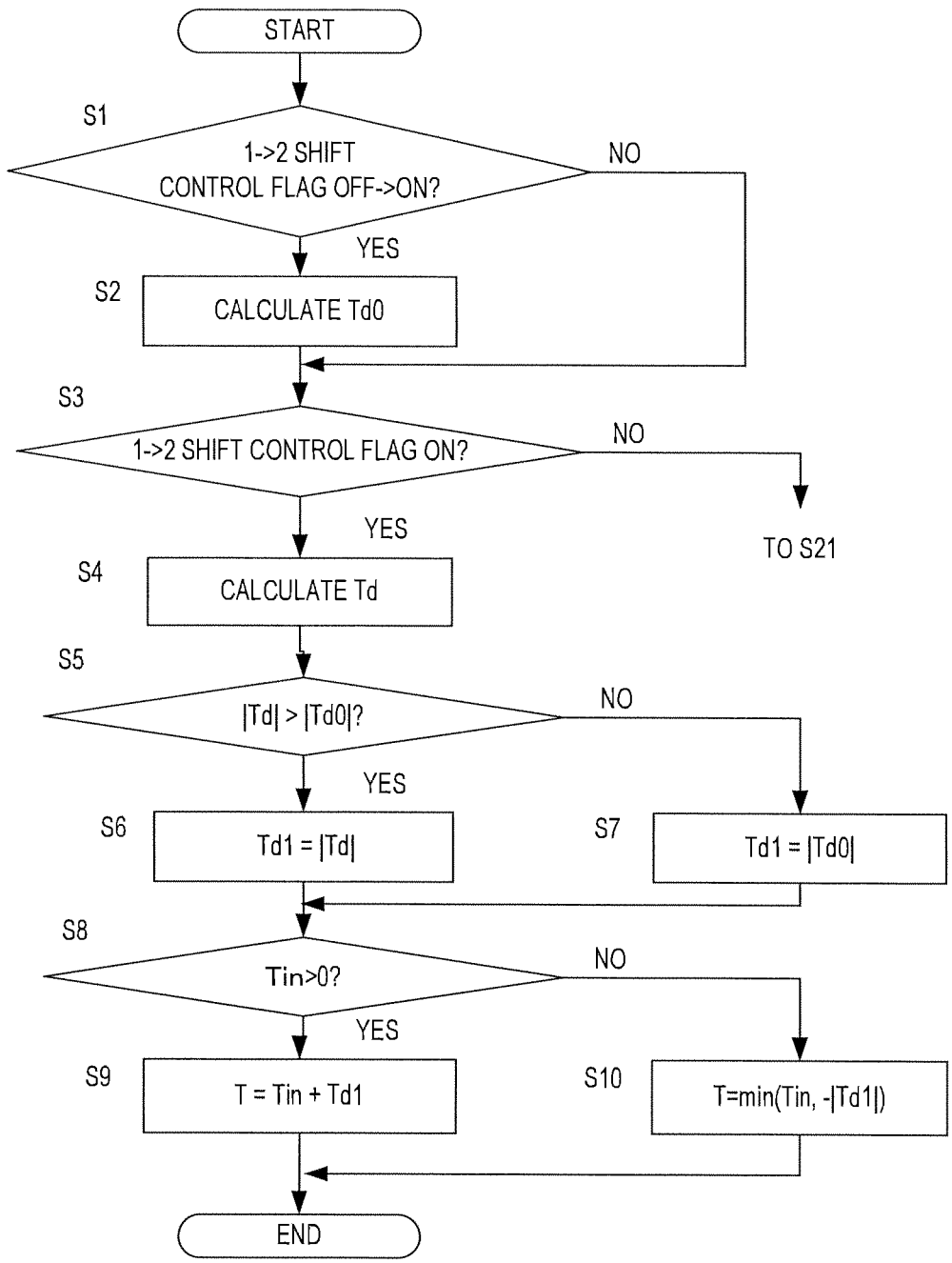
FIGS. 4A and 4B are flowcharts showing control executed by the transmission controller.
Figure 4B:
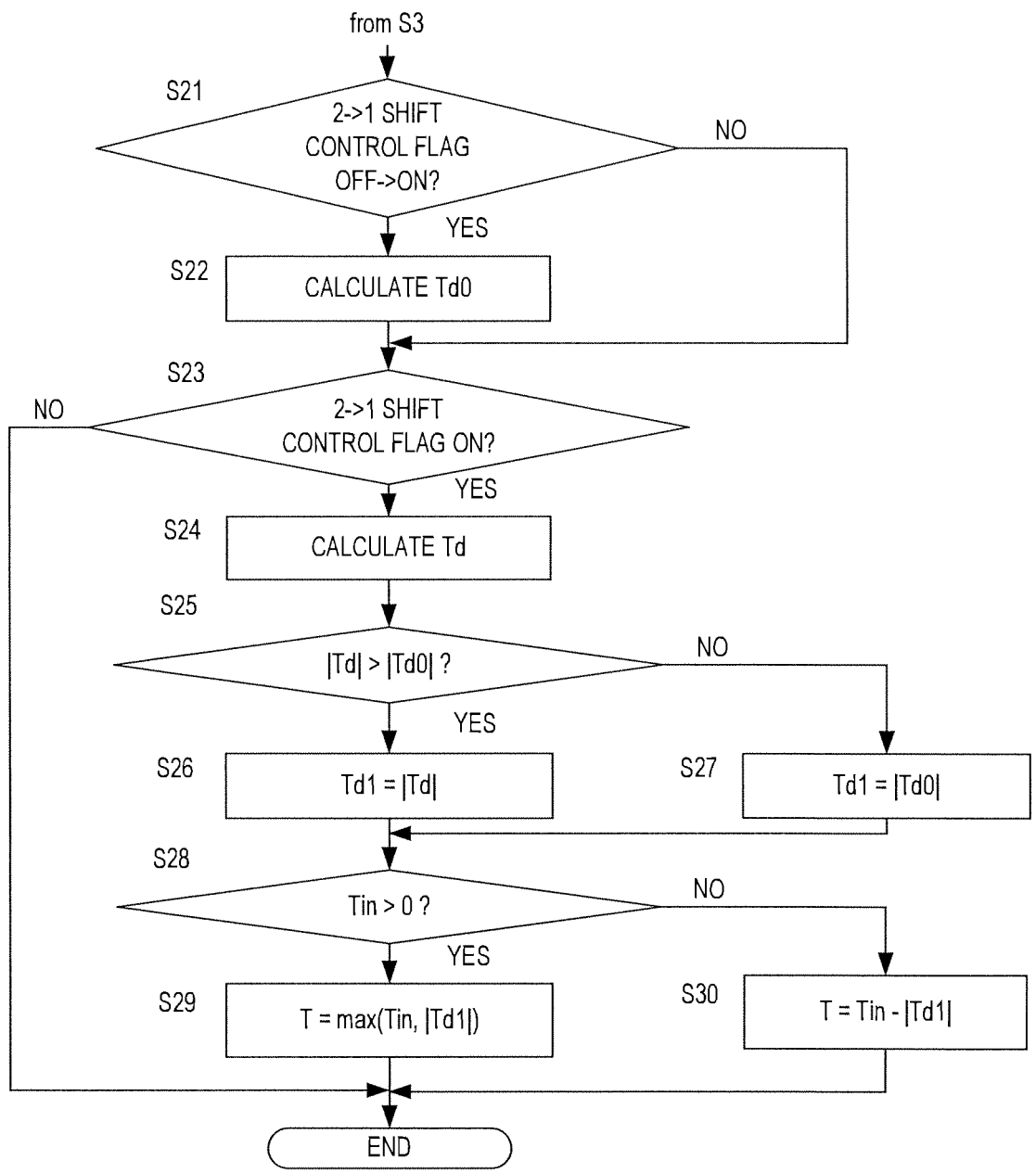

Therefore, in this embodiment, the input torque estimation value used during the line pressure control is set in the following manner. FIGS. 4A and 4B are flowcharts showing control executed to set the input torque estimation value used during the line pressure control.

In a step S1, a determination is made as to whether or not a 1→2 shift control flag of the subtransmission mechanism 30 has varied from OFF to ON. When it is determined that the control flag has varied to ON, the routine advances to a step S2, and when it is determined that the control flag has not varied, the routine advances to a step S3. The 1→2 shift control flag turns ON when it is determined that the subtransmission mechanism 30 is performing a 1→2 shift, and on the shift map shown in FIG. 3, the 1→2 shift control flag turns ON when the operating point of the transmission 4 crosses the mode switch shift line from the large speed ratio side to the small speed ratio side.

In the step S2, an inertia torque design value Td0 is calculated. Inertia torque is generated in the output shaft 24 of the variator 20 when the subtransmission mechanism 30 shifts to the second gear position such that the rotation speed of the output shaft 24 of the variator decreases. The inertia torque design value Td0 is calculated in accordance with a following Equation (1).

$$T_d0 = J\omega0' \qquad (1)$$

Here, J is a moment of inertia about the output shaft 24 of the variator 20, and $\omega0'$ is an angular velocity of the output shaft 24.

The angular velocity $\omega0'$ of the output shaft 24 is calculated in accordance with a following Equation (2).

$$\omega0' = \frac{(\omega0/i) - \omega0}{\Delta t} \qquad (2)$$

Here, $\omega0$ is the rotation speed of the output shaft 24 when the 1→2 shift control flag of the subtransmission mechanism 30 varies from OFF to ON, i is a ratio between the speed ratio of the first speed and the speed ratio of the second speed of the subtransmission mechanism 30, and $\Delta t$ is a shift time of the subtransmission mechanism 30. It should be noted that the shift time $\Delta t$ of the subtransmission mechanism 30 is the time required to shift from the first speed to the second speed, which is a minimum shift time determined in advance through experiment or the like taking irregularities into account.

In the step S3, a determination is made as to whether or not the 1→2 shift control flag of the subtransmission mechanism 30 is ON. When it is determined that the control flag is ON, the routine advances to a step S4, and when it is determined that the control flag is OFF, the routine advances to a step S21 in FIG. 4B.

In the step S4, an inertia torque actual measurement value Td is calculated. The inertia torque actual measurement value Td is calculated in accordance with the following Equations (3) and (4).

$$T_d = J\omega' \qquad (3)$$

$$\omega' = \frac{d\omega}{dt} \qquad (4)$$

When calculating the inertia torque actual measurement value Td, the angular velocity $\omega'$ of the output shaft 24 employed in the calculation is the angular velocity at the point of calculation, which is calculated in real time, rather than the predetermined design value. Therefore, the inertia torque actual measurement value Td is calculated as the inertia torque actually applied to the variator 20 at the point of calculation.

In a step S5, a determination is made as to whether or not an absolute value |Td| of the inertia torque actual measurement value is larger than an absolute value |Td0| of the inertia torque design value. When it is determined that the absolute value |Td| of the inertia torque actual measurement value is larger than the absolute value |Td0| of the inertia torque design value, the routine advances to a step S6, in which the absolute value |Td| of the inertia torque actual measurement value is set as an input torque correction amount Td1. When it is determined that the absolute value |Td| of the inertia torque actual measurement value is equal to or smaller than the absolute value |Td0| of the inertia torque design value, the routine advances to a step S7, in which the absolute value |Td0| of the inertia torque design value is set as the input torque correction amount Td1.

In a step S8, a determination is made as to whether or not an input torque estimation value Tin is larger than zero. When it is determined that the input torque estimation value Tin is larger than zero, the routine advances to a step S9, in which a input torque estimation value T is set by adding the input torque correction amount |Td1| to the input torque estimation value Tin. In other words, the input torque estimation value T is calculated on the basis of a following Equation (5).

$$T = Tin + |Td1| \qquad (5)$$

Figure 5:
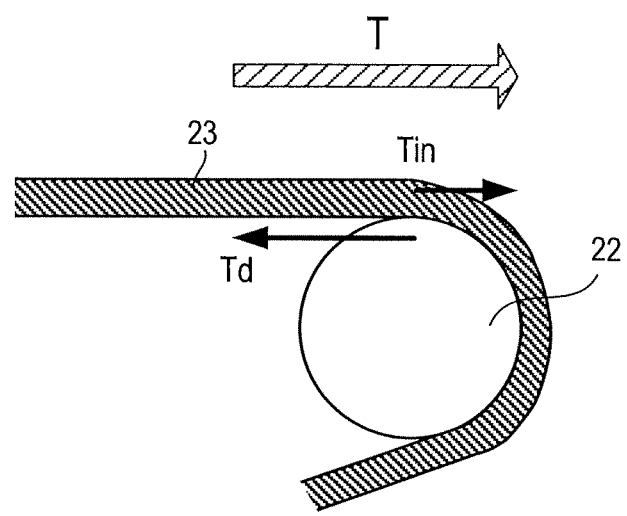
FIG. 5 is a diagram showing force acting on a secondary pulley and a belt.

Here, a case in which the input torque estimation value Tin is larger than zero corresponds to a case in which the operating point of the transmission 4 crosses the mode switch shift line in a state where the driver has depressed the accelerator pedal such that acceleration is underway (hereafter, an upshift of the subtransmission mechanism 30 in this case will be referred to as an "auto-upshift"), and as shown in FIG. 5, in this case the input torque Tin from the engine 1 and the input torque Td from the subtransmission mechanism 30 act in opposite directions.

Hence, by adding the input torque correction amount |Td1| to the input torque estimation value Tin in the step S9 during an auto-upshift, a value obtained by adding together the input torque Tin from the engine 1 and the inertia torque |Td|, i.e. the input torque from the subtransmission mechanism 30, can be set as the input torque estimation value T. It should be noted that in FIGS. 5 to 8B, force acting in a rightward direction is positive.

When it is determined in the step S8 that the input torque estimation value Tin is equal to or smaller than zero, the routine advances to a step S10, in which the smaller of the input torque estimation value Tin and an input torque correction amount −|Td1| is set as the input torque estimation value T. In other words, the input torque estimation value T is calculated on the basis of a following Equation (6).

$$T = \min(Tin, -|Td1|) \qquad (6)$$

It should be noted that in this case, Tin and −|Td1| are both negative, and therefore the one having a larger absolute value is selected.

Figure 6A:
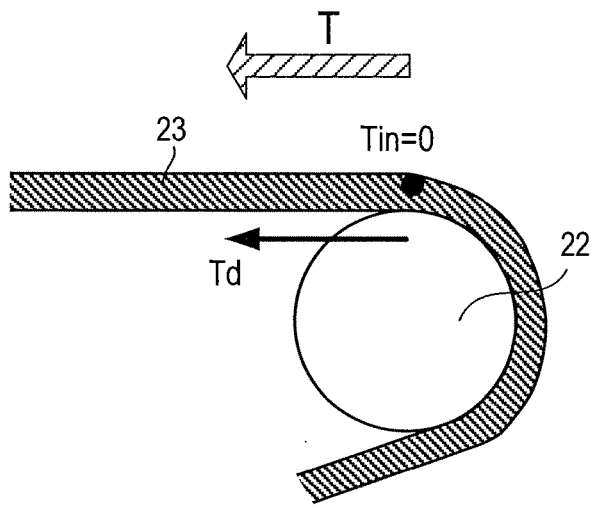
FIGS. 6A-6C are diagrams showing the force acting on the secondary pulley and the belt.
Figure 6B:
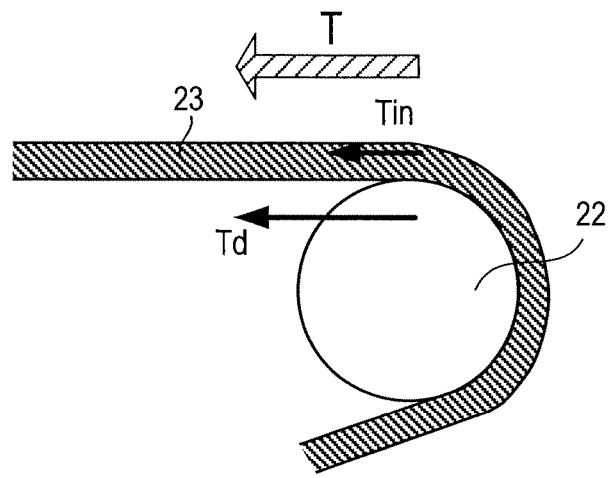
Figure 6C:
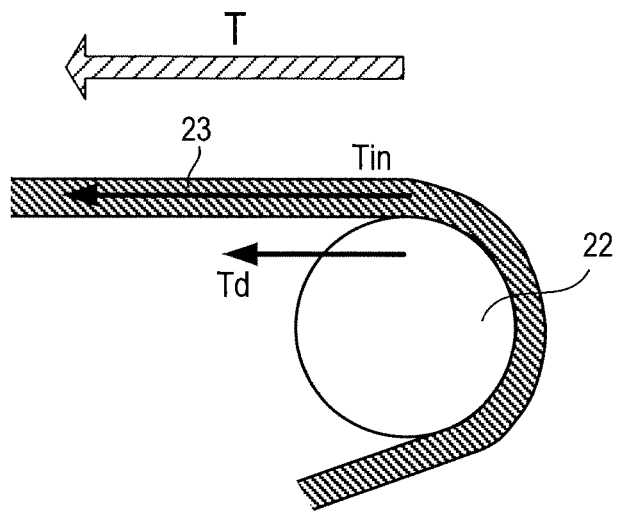

Here, a case in which the input torque estimation value Tin is equal to or smaller than zero corresponds to a case in which the operating point of the transmission 4 crosses the mode switch shift line in a state where the driver has removed his/her foot from the accelerator pedal (hereafter, an upshift of the subtransmission mechanism 30 in this case will be referred to as a "foot release upshift"), and as shown in FIGS. 6A-6C, in this case the input torque Tin from the engine 1 acts in the same direction as the input torque Td from the subtransmission mechanism 30. This case may occur in any of three patterns, namely when the input torque Tin from the engine 1 is zero (FIG. 6A), when the input torque |Tin| from the engine 1 is smaller than the input torque |Td| from the subtransmission mechanism 30 (FIG. 6B), and when the input torque |Tin| from the engine 1 is larger than the input torque |Td| from the subtransmission mechanism 30 (FIG. 6C).

Hence, by advancing to the step S10 when a foot release upshift occurs, the smaller (the one having the larger absolute value) of the input torque Tin from the engine 1 and an inertia torque −|Td| which is the input torque from the subtransmission mechanism 30 can be set as the input torque estimation value T.

When it is determined in the step S3 that the 1→2 shift control flag of the subtransmission mechanism 30 is OFF, on the other hand, the routine advances to the step S21 of FIG. 4B, in which a determination is made as to whether or not a 2→1 shift control flag of the subtransmission mechanism 30 has varied from OFF to ON. When it is determined that the control flag has varied to ON, the routine advances to a step S22, and when it is determined that the control flag has not varied, the routine advances to a step S23. The 2→1 shift control flag turns ON when it is determined that the subtransmission mechanism 30 is performing a 2→1 shift, and on the shift map shown in FIG. 3, the 2→1 shift control flag turns ON when the operating point of the transmission 4 crosses the mode switch shift line from the small speed ratio side to the large speed ratio side.

In the step S22, the inertia torque design value Td0 is calculated. Inertia torque is generated in the output shaft 24 when the subtransmission mechanism 30 shifts to the first gear position such that the rotation speed of the output shaft 24 of the variator 20 increases. The inertia torque design value Td0 is calculated in accordance with following Equations (7) and (8).

$$T_d 0 = j\omega 0' \quad (7)$$

Here, J is a moment of inertia about the output shaft 24 of the variator 20, and ω0' is an angular velocity of the output shaft 24.

The angular velocity ω0' of the output shaft 24 is calculated in accordance with the following Equation (8).

$$\omega 0' = \frac{(\omega 0 \times i) - \omega 0}{\Delta t} \quad (8)$$

Here, ω0 is the rotation speed of the output shaft 24 when the 2→1 shift control flag of the subtransmission mechanism 30 varies from OFF to ON, i is a ratio between the speed ratio of the first speed and the speed ratio of the second speed of the subtransmission mechanism 30, and Δt is a shift time of the subtransmission mechanism 30. It should be noted that the shift time Δt of the subtransmission mechanism 30 is the time required to shift from the second speed to the first speed, which is a minimum shift time determined in advance through experiment or the like taking irregularities into account.

In the step S23, a determination is made as to whether or not the 2→1 shift control flag of the subtransmission mechanism 30 is ON. When it is determined that the control flag is ON, the routine advances to a step S24, and when it is determined that the control flag is OFF, the routine is terminated.

In the step S24, the inertia torque actual measurement value Td is calculated. The inertia torque actual measurement value Td is calculated in accordance with the above Equations (3) and (4).

In a step S25, a determination is made as to whether or not the absolute value |Td| of the inertia torque actual measurement value is larger than the absolute value |Td0| of the inertia torque design value. When it is determined that the absolute value |Td| of the inertia torque actual measurement value is larger than the absolute value |Td0| of the inertia torque design value, the routine advances to a step S26, in which the absolute value |Td| of the inertia torque actual measurement value is set as the input torque correction amount Td1. When it is determined that the absolute value |Td| of the inertia torque actual measurement value is equal to or smaller than the absolute value |Td0| of the inertia torque design value, the routine advances to a step S27, in which the absolute value |Td0| of the inertia torque design value is set as the input torque correction amount Td1.

In a step S28, a determination is made as to whether or not the input torque estimation value Tin is larger than zero. When it is determined that the input torque estimation value Tin is larger than zero, the routine advances to a step S29, in which the larger of the input torque estimation value Tin and the input torque correction amount |Td1| is set as the input torque estimation value T. In other words, the input torque estimation value T is calculated on the basis of a following Equation (9).

$$T = \max(Tin, |Td1|) \quad (9)$$

It should be noted that in this case, Tin and |Td1| are both positive.

Figure 7A:
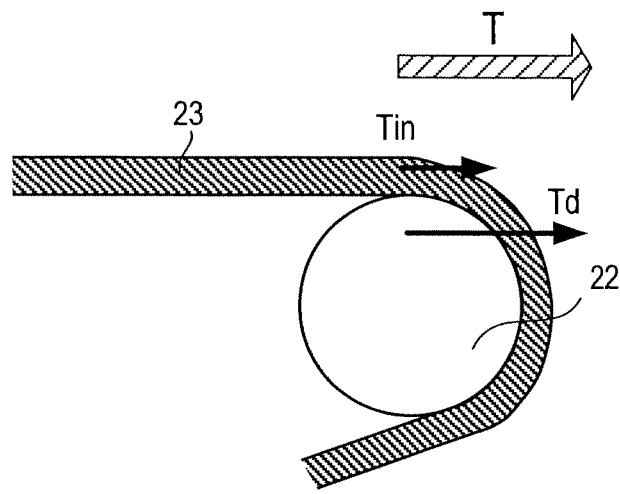
FIGS. 7A and 7B are diagrams showing the force acting on the secondary pulley and the belt.
Figure 7B:
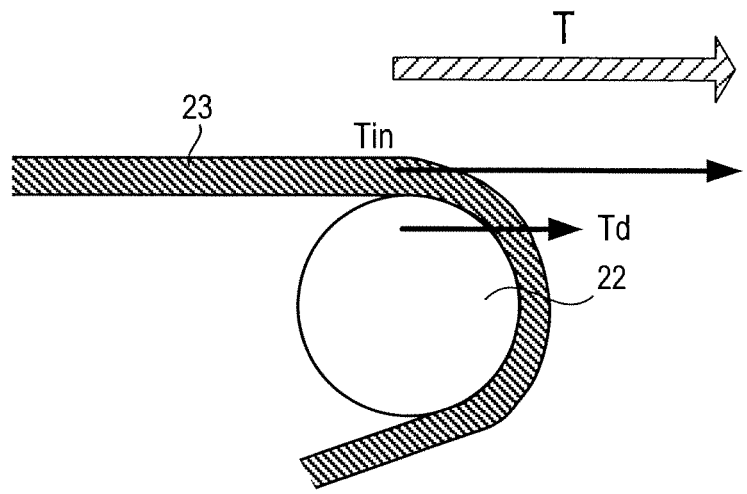

Here, a case in which the input torque estimation value Tin is larger than zero corresponds to a case in which the operating point of the transmission 4 crosses the mode switch shift line to the large speed ratio side in a state where the drive has depressed the accelerator pedal such that acceleration is underway. As shown in FIGS. 7A, 7B, this case may occur in two patterns, namely when the input torque Tin from the engine 1 is smaller than the input torque Td from the subtransmission mechanism 30 (FIG. 7A) and when the input torque Tin from the engine 1 is larger than the input torque Td from the subtransmission mechanism 30 (FIG. 7B).

Hence, in this case, the larger of the input torque Tin from the engine 1 and the inertia torque |Td1| which is the input torque from the subtransmission mechanism 30 can be set as the input torque estimation value T in the step S29.

When it is determined that the input torque estimation value Tin is equal to or smaller than zero, the routine advances to a step S30, in which the input torque estimation value T is set by subtracting the input torque correction amount |Td1| from the input torque estimation value Tin. In other words, the input torque estimation value T is calculated on the basis of a following Equation (10).

$$T = Tin - |Td1| \quad (10)$$

Figure 8A:
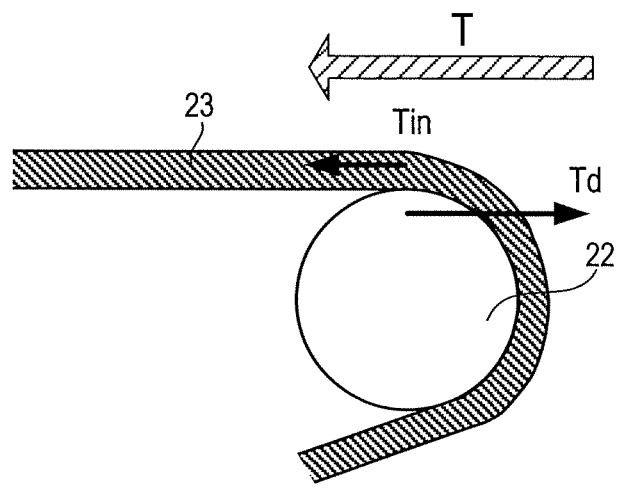
FIGS. 8A and 8B are diagrams showing the force acting on the secondary pulley and the belt.
Figure 8B:
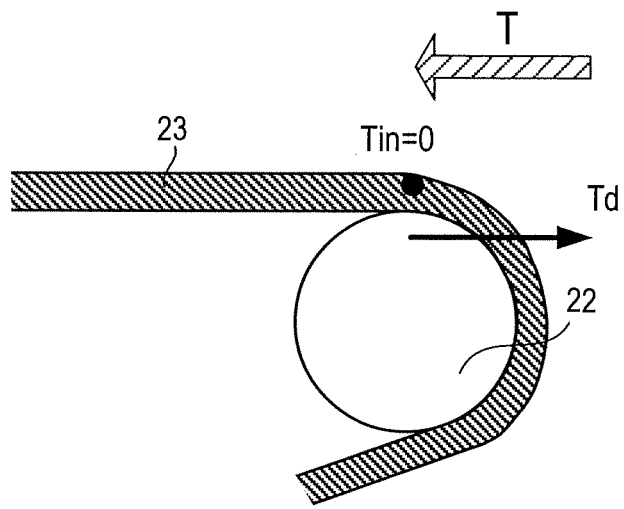

Here, a case in which the input torque estimation value Tin is equal to or smaller than zero corresponds to a case in which the operating point of the transmission 4 crosses the mode switch shift line in a state where the driver has removed his/her foot from the accelerator pedal. As shown in FIGS. 8A, 8B, this case may occur in either of two patterns, namely when the input torque Tin from the engine 1 and the input torque Td from the subtransmission mechanism 30 act in opposite directions (FIG. 8A) and when the input torque Tin is zero (FIG. 8B).

Hence, in the step S30 in this case, a value obtained by subtracting the inertia torque |Td1| which is the input torque from the subtransmission mechanism 30, which is a positive value, from the input torque estimation value Tin from the engine 1, which is a negative value, (i.e. a value obtained by adding together the absolute values of Tin and Td1×(−1)) can be set as the input torque estimation value T.

Next, actions obtained by performing the above control will be described. FIGS. 9A-9E are timing charts showing variation during a 1→2 shift in the subtransmission mechanism 30 in the case of an auto-upshift. FIG. 9A indicates the 1→2 shift control flag of the subtransmission mechanism 30. FIG. 9B indicates the line pressure command value. FIG. 9C indicates the secondary pulley rotation speed. FIG. 9D indicates |engine torque|+|inertia torque|. FIG. 9E indicates the corrected input torque estimation value T.

When the 1→2 shift control flag of the subtransmission mechanism 30 switches ON at a time t1, the inertia torque design value |Td0| which is the input torque from the subtransmission mechanism 30 is added to the input torque estimation value Tin. As a result, the input torque estimation value T increases, and therefore the line pressure command value increases. It should be noted that if the line pressure increases rapidly, shock may occur, and therefore the line pressure command value is increased gradually at a predetermined increase rate.

In this embodiment, the input torque is corrected by adding the inertia torque design value |Td0| to the input torque estimation value Tin as soon as the 1→2 shift control flag switches ON, but input torque correction is actually required during an inertia phase, and therefore input torque correction may be started after entering the inertia phase.

At a time t2, a preparatory phase is entered. In the preparatory phase, the transmission controller 12 performs precharging to increase the oil pressure of the High clutch 33 which is to be engaged temporarily, and then sets the oil pressure at a predetermined oil pressure and enters standby. Further, the transmission controller 12 sets the oil pressure of the Low brake 32 which is to be disengaged at a predetermined oil pressure and then enters standby.

At a time t3, a torque phase is entered to pass torque between the High clutch 33 which is to be engaged and the Low brake 32 to be disengaged, and at a time t4, the inertia phase is entered to shift the subtransmission mechanism 30 and the variator 20.

In the inertia phase, the transmission controller 12 gradually increases the oil pressure of the High clutch 33 to be engaged in order to engage the High clutch 33 gradually. At this time, the oil pressure of the Low brake 32 to be disengaged is maintained at the predetermined oil pressure determined in the preparatory phase. As a result, the Low brake 32 is gradually disengaged and the High clutch 33 is gradually engaged, whereby the subtransmission mechanism 30 gradually shifts from the first speed to the second speed.

When performing a shift in the subtransmission mechanism 30, the transmission controller 12 gradually shifts the speed ratio vRatio of the variator 20 in an opposite direction to speed ratio variation in the subtransmission mechanism 30. More specifically, the transmission controller 12 varies the width of the respective V grooves of the pulleys 21, 22 by adjusting the oil pressure supplied to the hydraulic cylinders 23a, 23b such that the speed ratio vRatio of the variator 20 is varied continuously from a small side to a large side.

At this time, the rotation speed of the secondary pulley 22 (the output shaft 24) decreases as the speed ratio vRatio of the variator 20 varies from the small side to the large side, and therefore inertia torque which is the input torque from the subtransmission mechanism 30 is generated in the output shaft 24. Accordingly, the required line pressure increases in proportion to the inertia torque, but since the line pressure command value has been corrected in an increasing direction on the basis of the corrected input torque estimation value T, thereby preventing a deficiency in the line pressure.

When the shift from the first speed to the second speed in the subtransmission mechanism 30 is complete, a final phase is entered at a time t5. In the final phase, the transmission controller 12 fully engages the High clutch 33 to engaged by boosting the oil pressure of the High clutch 33 to a predetermined oil pressure, and fully disengages the Low brake 32 to be disengaged by draining the oil pressure of the Low brake 32.

When the final phase ends at a time t6, the 1→2 shift control flag switches OFF and correction of the input torque estimation value Tin is terminated, leading to a reduction in the line pressure command value. It should be noted that if the line pressure decreases rapidly, shock may occur, and therefore the line pressure command value is reduced gradually at a predetermined reduction rate.

Further, when the rotation speed of the secondary pulley 22 (the output shaft 24) decreases further than envisaged due to a reduction in the vehicle speed or the like during the inertia phase (t4-t5) (dot-dash lines in FIGS. 9C to 9E) or when the rotation speed of the secondary pulley 22 (the output shaft 24) decreases more rapidly than envisaged due to excessively high oil pressure in the High clutch 33 to be engaged (dotted lines in FIGS. 9C to 9E), the inertia torque increases above the design value, but in such cases, the input torque estimation value Tin is corrected using the actual measurement value |Td| of the inertia torque as the correction amount Td1, and therefore a deficiency in the line pressure can be prevented.

In this embodiment, as described above, the required oil pressure during a shift in the subtransmission mechanism 30 is calculated on the basis of the input torque input into the variator 20 from the engine 1 and the inertia torque input into the variator 20 from the subtransmission mechanism 30, and therefore sufficient oil pressure can be secured even when the rotation speed of the output shaft 24 varies due to the shift in the subtransmission mechanism 30 such that the inertia torque is input into the variator 20. Hence, slippage occurring when a contact frictional force between the belt 23 and the respective pulleys 21, 22 is insufficient due to an oil pressure deficiency can be prevented.

Further, when the subtransmission mechanism 30 shifts from a first gear position to a second gear position and the input torque from the engine 1 is positive (S3: YES and S8: YES in FIG. 4A) or when the subtransmission mechanism 30 shifts from the second gear position to the first gear position and the input torque from the engine 1 is negative (S23: YES and S28: NO in FIG. 4B), a sum total of the input torque from the engine 1 and the inertia torque is set as the input torque estimation value T, and therefore an appropriate line pressure taking the inertia torque into account can be set under an operating condition in which the input torque and the inertia torque act in opposite directions. As a result, belt slippage due to insufficient line pressure can be prevented even more reliably.

Furthermore, when the subtransmission mechanism 30 shifts from the first gear position to the second gear position and the input torque from the engine 1 is negative (S3: YES and S8: NO in FIG. 4A) or when the subtransmission mechanism 30 shifts from the second gear position to the first gear position and the input torque from the engine 1 is positive (S23: YES and S28: YES in FIG. 4B), the larger of the absolute values of the input torque and the inertia torque is set as the input torque estimation value T, and therefore an appropriate line pressure taking the inertia torque into account can be set under an operating condition in which the input torque and the inertia torque act in the same direction. As a result, belt slippage due to insufficient line pressure can be prevented even more reliably.

Moreover, when the inertia torque actual measurement value Td exceeds the design value during a shift in the subtransmission mechanism 30, the input torque estimation value Tin is corrected using the inertia torque actual measurement value |Td| as the input torque correction amount Td1, and therefore, even when the actual angular velocity of the output shaft of the variator 20 increases due to variation in the vehicle speed during the shift in the subtransmission mechanism 30 or an excessive pressure supply to the High clutch 33, inertia torque corresponding to the varied angular velocity can be estimated. Hence, belt slippage due to insufficient line pressure can be prevented even more reliably.

This invention is not limited to the embodiment described above, and may be subjected to various amendments and modifications within the scope of the technical spirit thereof.

For example, in the above embodiment, the belt 23 is cited as an example of a wrapped member wrapped around the primary pulley 21 and secondary pulley 22, but the belt 23 may be constituted by a link plate chain, in which a large number of link plates are joined by inserting pins into notches formed on link plates, for example.

This application claims priority based on Japanese Patent Application No. 2009-195867, filed with the Japan Patent Office on Aug. 26, 2009, the entire content of which is incorporated into this specification by reference.

What is claimed is:

1. A continuously variable transmission installed in a vehicle, comprising:
   a continuously variable speed change mechanism that has a primary pulley into which a driving force is input from an power source, a secondary pulley which outputs a driving force, and a wrapped member wrapped around the primary pulley and the secondary pulley, and that is capable of modifying a speed ratio continuously in accordance with oil pressure supplied to the primary pulley and the secondary pulley;
   a subtransmission mechanism that is provided on a downstream side of the continuously variable speed change mechanism and includes, as forward gear positions, a first gear position and a second gear position having a smaller speed ratio than the first gear position;
   a shift control unit that controls the speed ratio of the continuously variable speed change mechanism in an opposite direction to a shift in the subtransmission mechanism during a shift in the subtransmission mechanism;
   a required oil pressure calculation unit that calculates a required oil pressure, which is an oil pressure required to maintain a contact frictional force between the respective pulleys and the wrapped member, on the basis of an input torque input into the continuously variable speed change mechanism from the power source;
   an oil pressure supply unit that supplies oil pressure to the continuously variable speed change mechanism on the basis of the required oil pressure; and
   an inertia torque estimation unit that estimates an inertia torque input into the continuously variable speed change mechanism from the subtransmission mechanism during a shift in the subtransmission mechanism,
   wherein, during a shift in the subtransmission mechanism, the required oil pressure calculation unit calculates the required oil pressure on the basis of the input torque and the inertia torque.

2. The continuously variable transmission as defined in claim 1, wherein, when a direction in which the input torque acts on the continuously variable speed change mechanism is different to a direction in which the inertia torque acts on the continuously variable speed change mechanism, the required oil pressure calculation unit calculates the required oil pressure on the basis of a sum total of absolute values of the input torque and the inertia torque.

3. The continuously variable transmission as defined in claim 1, wherein, when a direction in which the input torque acts on the continuously variable speed change mechanism is identical to a direction in which the inertia torque acts on the continuously variable speed change mechanism, the required oil pressure calculation unit calculates the required oil pressure on the basis of a larger absolute value from among absolute values of the input torque and the inertia torque.

4. The continuously variable transmission as defined in claim 1, wherein, when the subtransmission mechanism shifts from the first gear position to the second gear position and the input torque is positive or when the subtransmission mechanism shifts from the second gear position to the first gear position and the input torque is negative, the required oil pressure calculation unit calculates the required oil pressure on the basis of a sum total of absolute values of the input torque and the inertia torque.

5. The continuously variable transmission as defined in claim 1, wherein, when the subtransmission mechanism shifts from the first gear position to the second gear position and the input torque is negative or when the subtransmission mechanism shifts from the second gear position to the first gear position and the input torque is positive, the required oil pressure calculation unit calculates the required oil pressure on the basis of a larger absolute value from among absolute values of the input torque and the inertia torque.

6. The continuously variable transmission as defined in claim 1, wherein the inertia torque estimation unit comprises:
   a design inertia torque calculation unit that calculates a design value of the inertia torque prior to a shift in the subtransmission mechanism, on the basis of a moment of inertia about an output shaft of the continuously variable speed change mechanism and an angular velocity of the output shaft during a shift in the subtransmission mechanism; and
   an actually measured inertia torque calculation unit that calculates an actual measurement value of the inertia torque during a shift in the subtransmission mechanism, and
   when the actual measurement value exceeds the design value, the required oil pressure calculation unit calculates the required oil pressure on the basis of the input torque and the actual measurement value of the inertia torque.

7. A control method for a continuously variable transmission installed in a vehicle, the transmission including a continuously variable speed change mechanism that has a primary pulley into which a driving force is input from an power source, a secondary pulley which outputs a driving force, and a wrapped member wrapped around the primary pulley and the secondary pulley, and that is capable of modifying a speed ratio continuously in accordance with oil pressure supplied to the primary pulley and the secondary pulley, and a subtransmission mechanism that is provided on a downstream side of the continuously variable speed change mechanism and includes, as forward gear positions, a first gear position and a second gear position having a smaller speed ratio than the first gear position, the method comprising:

controlling the speed ratio of the continuously variable speed change mechanism in an opposite direction to a shift in the subtransmission mechanism during a shift in the subtransmission mechanism;

calculating a required oil pressure, which is an oil pressure required to maintain a contact frictional force between the respective pulleys and the wrapped member, on the basis of an input torque input into the continuously variable speed change mechanism from the power source;

supplying oil pressure to the continuously variable speed change mechanism on the basis of the required oil pressure; and estimating an inertia torque input into the continuously variable speed change mechanism from the subtransmission mechanism during a shift in the subtransmission mechanism, wherein, during a shift in the subtransmission mechanism, the required oil pressure is calculated on the basis of the input torque and the inertia torque.

8. The control method as defined in claim 7, wherein, when a direction in which the input torque acts on the continuously variable speed change mechanism is different to a direction in which the inertia torque acts on the continuously variable speed change mechanism, the required oil pressure is calculated on the basis of a sum total of absolute values of the input torque and the inertia torque.

9. The control method as defined in claim 7, wherein, when a direction in which the input torque acts on the continuously variable speed change mechanism is identical to a direction in which the inertia torque acts on the continuously variable speed change mechanism, the required oil pressure is calculated on the basis of a larger absolute value from among absolute values of the input torque and the inertia torque.

10. The control method as defined in claim 7, wherein, when the subtransmission mechanism shifts from the first gear position to the second gear position and the input torque is positive or when the subtransmission mechanism shifts from the second gear position to the first gear position and the input torque is negative, the required oil pressure is calculated on the basis of a sum total of absolute values of the input torque and the inertia torque.

11. The control method as defined in claim 7, wherein, when the subtransmission mechanism shifts from the first gear position to the second gear position and the input torque is negative or when the subtransmission mechanism shifts from the second gear position to the first gear position and the input torque is positive, the required oil pressure is calculated on the basis of a larger absolute value from among absolute values of the input torque and the inertia torque.

12. The control method as defined in claim 7, further comprising:

calculating a design value of the inertia torque prior to a shift in the subtransmission mechanism, on the basis of a moment of inertia about an output shaft of the continuously variable speed change mechanism and an angular velocity of the output shaft during a shift in the subtransmission mechanism; and calculating an actual measurement value of the inertia torque during a shift in the subtransmission mechanism, wherein when the actual measurement value exceeds the design value, the required oil pressure is calculated on the basis of the input torque and the actual measurement value of the inertia torque.

13. A continuously variable transmission installed in a vehicle, comprising:

a continuously variable speed change mechanism that has a primary pulley into which a driving force is input from an power source, a secondary pulley which outputs a driving force, and a wrapped member wrapped around the primary pulley and the secondary pulley, and that is capable of modifying a speed ratio continuously in accordance with oil pressure supplied to the primary pulley and the secondary pulley;

a subtransmission mechanism that is provided on a downstream side of the continuously variable speed change mechanism and includes, as forward gear positions, a first gear position and a second gear position having a smaller speed ratio than the first gear position;

a shift control means for controlling the speed ratio of the continuously variable speed change mechanism in an opposite direction to a shift in the subtransmission mechanism during a shift in the subtransmission mechanism;

a required oil pressure calculation means for calculating a required oil pressure, which is an oil pressure required to maintain a contact frictional force between the respective pulleys and the wrapped member, on the basis of an input torque input into the continuously variable speed change mechanism from the power source;

an oil pressure supply means for supplying oil pressure to the continuously variable speed change mechanism on the basis of the required oil pressure; and an inertia torque estimation means for estimating an inertia torque input into the continuously variable speed change mechanism from the subtransmission mechanism during a shift in the subtransmission mechanism, wherein, during a shift in the subtransmission mechanism, the required oil pressure calculation means calculates the required oil pressure on the basis of the input torque and the inertia torque.

14. The continuously variable transmission as defined in claim 13, wherein, when a direction in which the input torque acts on the continuously variable speed change mechanism is different to a direction in which the inertia torque acts on the continuously variable speed change mechanism, the required oil pressure calculation means calculates the required oil pressure on the basis of a sum total of absolute values of the input torque and the inertia torque.

15. The continuously variable transmission as defined in claim 13, wherein, when a direction in which the input torque acts on the continuously variable speed change mechanism is identical to a direction in which the inertia torque acts on the continuously variable speed change mechanism, the required oil pressure calculation means calculates the required oil pressure on the basis of a larger absolute value from among absolute values of the input torque and the inertia torque.

16. The continuously variable transmission as defined in claim 13, wherein, when the subtransmission mechanism shifts from the first gear position to the second gear position and the input torque is positive or when the subtransmission mechanism shifts from the second gear position to the first gear position and the input torque is negative, the required oil pressure calculation means calculates the required oil pressure on the basis of a sum total of absolute values of the input torque and the inertia torque.

17. The continuously variable transmission as defined in claim 13, wherein, when the subtransmission mechanism shifts from the first gear position to the second gear position and the input torque is negative or when the subtransmission mechanism shifts from the second gear position to the first gear position and the input torque is positive, the required oil pressure calculation means calculates the required oil pressure on the basis of a larger absolute value from among absolute values of the input torque and the inertia torque.

18. The continuously variable transmission as defined in claim 13, wherein the inertia torque estimation means comprises:
   a design inertia torque calculation means for calculating a design value of the inertia torque prior to a shift in the subtransmission mechanism, on the basis of a moment of inertia about an output shaft of the continuously variable speed change mechanism and an angular velocity of the output shaft during a shift in the subtransmission mechanism; and
   an actually measured inertia torque calculation means for calculating an actual measurement value of the inertia torque during a shift in the subtransmission mechanism,
   wherein, when the actual measurement value exceeds the design value, the required oil pressure calculation means calculates the required oil pressure on the basis of the input torque and the actual measurement value of the inertia torque.

* * * * *